US012177626B2

(12) United States Patent
Itoh et al.

(10) Patent No.: US 12,177,626 B2
(45) Date of Patent: Dec. 24, 2024

(54) ELECTROACOUSTIC CONVERSION DEVICE

(71) Applicant: Panasonic Intellectual Property Management Co., Ltd., Osaka (JP)

(72) Inventors: Satoshi Itoh, Kyoto (JP); Mitsukazu Kuze, Osaka (JP); Shinya Kagawa, Osaka (JP); Kiyohisa Hattori, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 184 days.

(21) Appl. No.: 17/967,565

(22) Filed: Oct. 17, 2022

(65) Prior Publication Data

US 2023/0129491 A1 Apr. 27, 2023

(30) Foreign Application Priority Data

Oct. 25, 2021 (JP) ................................ 2021-173836

(51) Int. Cl.

| | |
|---|---|
| ***H04R 1/24*** | (2006.01) |
| ***H04R 3/00*** | (2006.01) |
| ***H04R 7/12*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ................ *H04R 1/24* (2013.01); *H04R 3/00* (2013.01); *H04R 7/12* (2013.01); *H04R 9/025* (2013.01); *H04R 9/046* (2013.01); *H04R 9/06* (2013.01); *H04R 2400/11* (2013.01)

(58) Field of Classification Search

CPC ... H04R 1/24; H04R 3/00; H04R 7/12; H04R 9/025; H04R 9/046; H04R 9/06; H04R 2400/11; H04R 9/063; H04R 1/06

See application file for complete search history.

(56) References Cited

U.S. PATENT DOCUMENTS

| | | | | |
|---|---|---|---|---|
| 5,764,784 | A | 6/1998 | Sato et al. | |
| 8,761,433 | B2 * | 6/2014 | Wehner | H04R 9/04 381/401 |
| 10,516,935 | B2 * | 12/2019 | Wiederholtz | H04R 9/046 |
| 10,863,268 | B1 * | 12/2020 | Torigoe | G06F 1/1605 |
| 2012/0170783 | A1 * | 7/2012 | Zha | H04R 9/025 381/332 |
| 2013/0315434 | A1 * | 11/2013 | Fujiwara | H04R 9/046 381/409 |

(Continued)

FOREIGN PATENT DOCUMENTS

| | | | | |
|---|---|---|---|---|
| JP | H06-013295 U | | 2/1994 | |
| JP | H08-140185 A | | 5/1996 | |
| TW | 201406172 A | * | 2/2014 | H04R 1/005 |

*Primary Examiner* — Akelaw Teshale

(74) *Attorney, Agent, or Firm* — GREENBLUM & BERNSTEIN, P.L.C.

(57) ABSTRACT

An electroacoustic conversion device includes a vibration plate, an inner voice coil attached to the vibration plate, an outer voice coil attached to the vibration plate outside the inner voice coil to surround the inner voice coil, a magnet, a yoke, and the frame which holds the vibration plate and the yoke. The magnet includes a wiring portion which is in a form of a through hole or a notch in which inner signal lines for the inner voice coil are provided.

11 Claims, 10 Drawing Sheets

(56) References Cited

U.S. PATENT DOCUMENTS

| | | | | |
|---|---|---|---|---|
| 2015/0125025 A1* | 5/2015 | Button | H04R 1/00 | 381/401 |
| 2015/0341727 A1* | 11/2015 | Akino | H04R 9/04 | 381/412 |

* cited by examiner

ELECTROACOUSTIC CONVERSION DEVICE

CROSS REFERENCE TO RELATED APPLICATION

The present application is based on and claims priority of Japanese Patent Application No. 2021-173836 filed on Oct. 25, 2021.

FIELD

The present disclosure relates to an electroacoustic conversion device.

BACKGROUND

To extend the frequency bandwidth of electroacoustic conversion devices such as loudspeakers to a high-frequency range, a technique of reducing the diameter of the vibration member has been proposed in the related art. On the other hand, there is a trade-off between a reduction in diameter of the vibration member and the electroacoustic conversion efficiency. Patent Literature (PTL) 1 discloses a technique of ensuring high efficiency and enabling extension of the frequency bandwidth to a high-frequency range by attaching two voice coils to one vibration plate, the voice coils being disposed coaxially.

CITATION LIST

Patent Literature

PTL 1: Japanese Utility Model Application Laid-Open No. H06-13295

SUMMARY

However, the loudspeaker according to PTL 1 can be improved upon.

In view of this, the present disclosure provides an electroacoustic conversion device capable of improving upon the above related art.

The electroacoustic conversion device according to one aspect of the present disclosure includes a vibration plate; an inner voice coil attached to the vibration plate; an outer voice coil attached to the vibration plate outside the inner voice coil to surround the inner voice coil; a magnet; a yoke; and a frame which holds the vibration plate and the yoke. Here, the magnet includes a wiring portion which is in a form of a through hole or a notch in which inner signal lines which are paired are provided, the inner signal lines being signal lines for the inner voice coil.

The electroacoustic conversion device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Hereinafter, embodiments of the electroacoustic conversion device according to the present disclosure will be described with reference to the drawings. The embodiments shown below are illustrative as examples to describe the present disclosure, and should not be construed as limitations to the present disclosure. For example, shapes, structures, materials, components, relatively positional relations, connection states, numeric values, expressions, contents of steps in methods, order of steps, and the like shown in the embodiments below are exemplary, and may contain contents not described below in some cases. When geometric expressions such as parallel and orthogonal are used, these expressions do not indicate mathematically strict meanings, and contain substantially allowable differences, deviations, and the like. Moreover, expressions such as simultaneous and identical also contain substantially allowable ranges.

The drawings are schematic illustrations appropriately subjected to emphasis, omission, or adjustment of ratios for describing the present disclosure, and are different from actual shapes, positional relations, and ratios.

Hereinafter, a plurality of aspects may be generally described as one embodiment. Part of the contents described below will be described as optional components related to the present disclosure.

Embodiment 1

Figure 1:
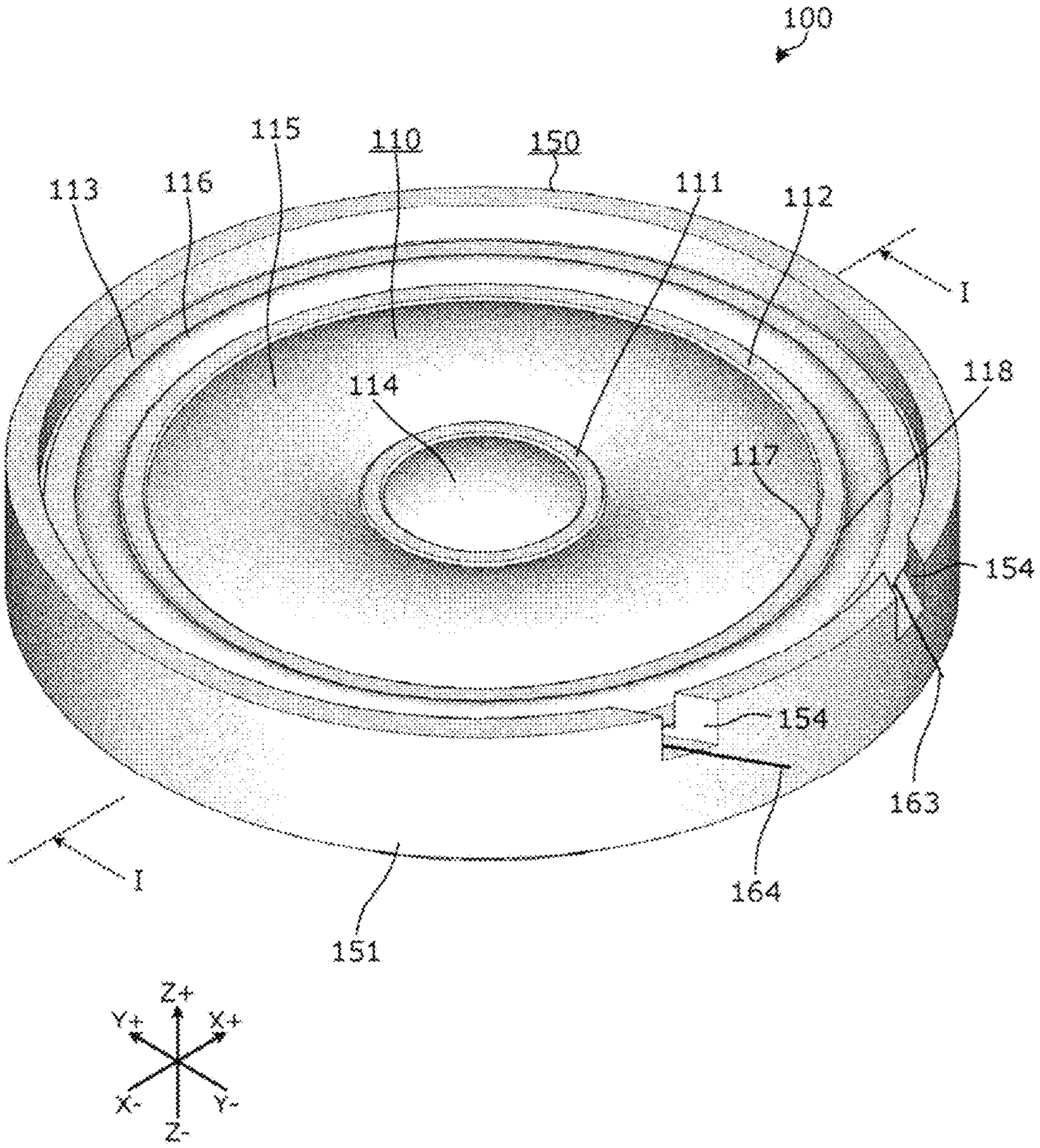
FIG. 1 is a perspective view illustrating an appearance of the electroacoustic conversion device according to Embodiment 1 when viewed from the side of a vibration plate.
Figure 2:
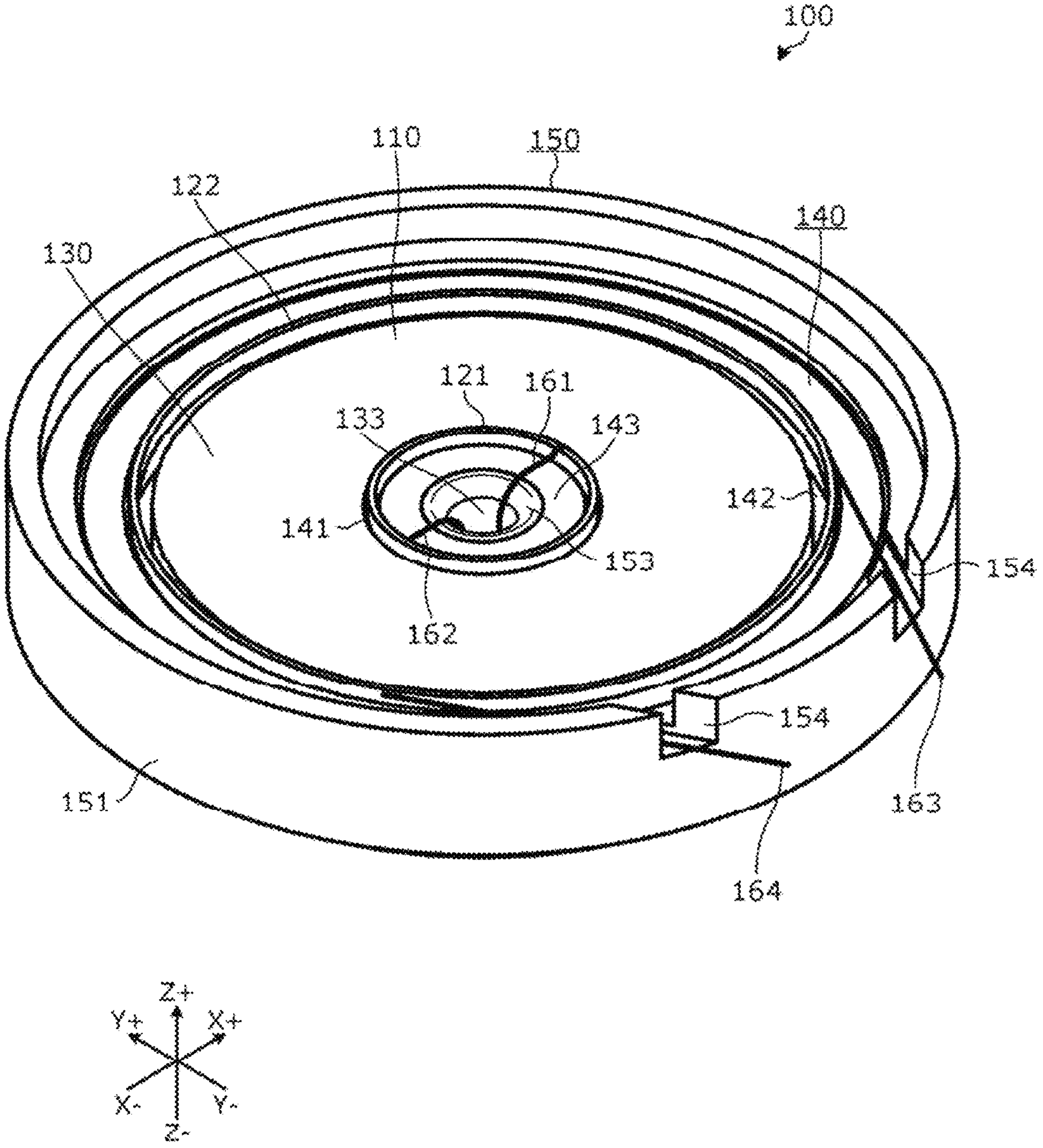
FIG. 2 is a perspective view illustrating the electroacoustic conversion device according to Embodiment 1 where the vibration plate is omitted.
Figure 3:
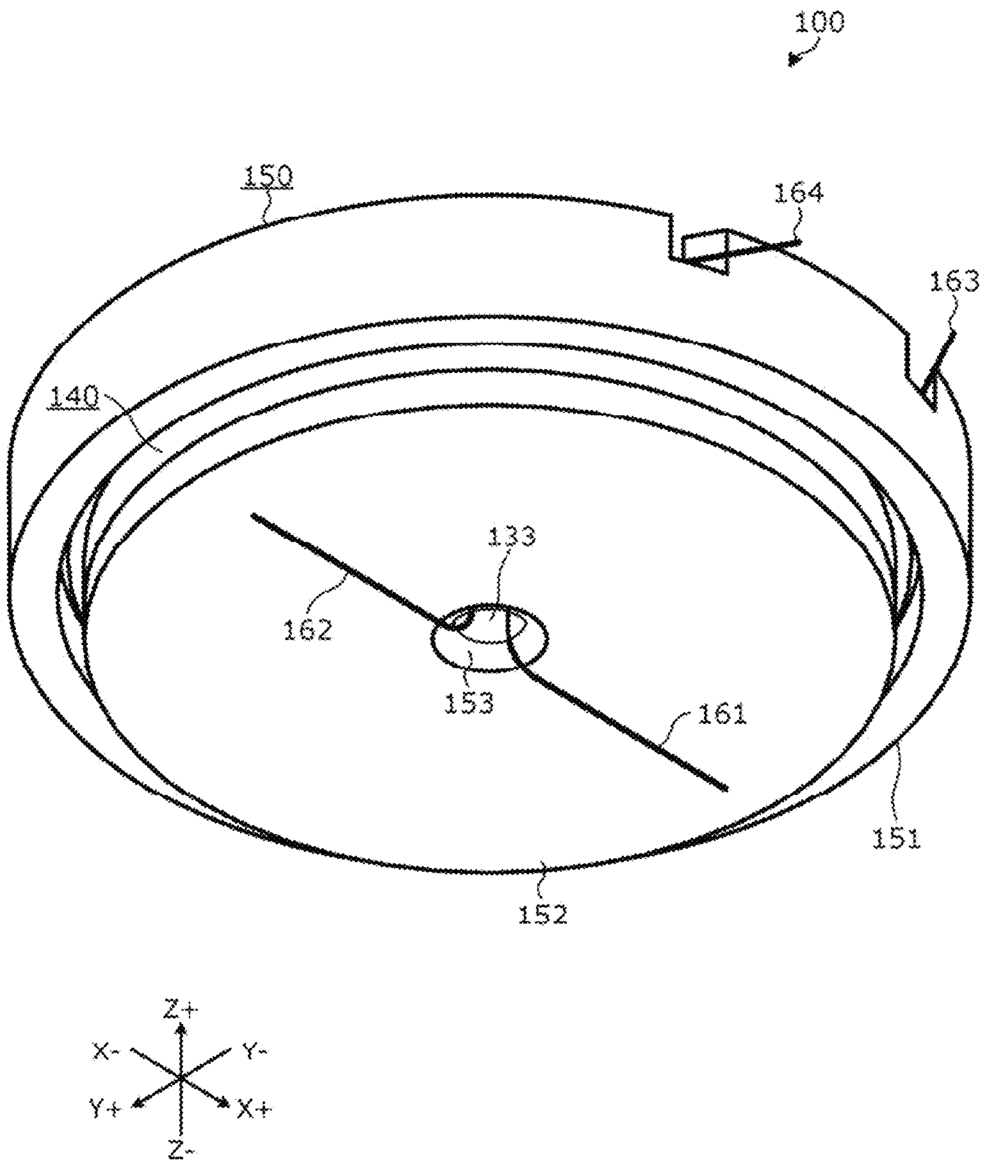
FIG. 3 is a perspective view illustrating an appearance of the electroacoustic conversion device according to Embodiment 1 when viewed from the side opposite to the vibration plate.
Figure 4:
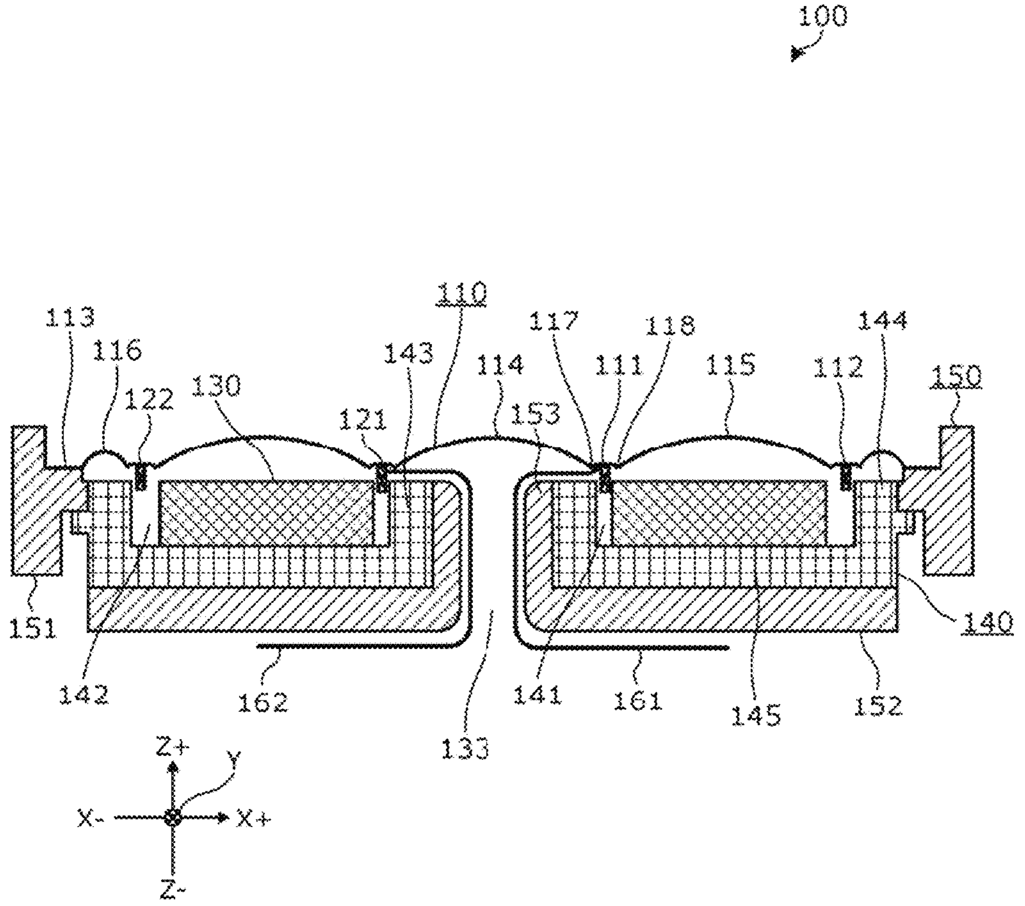
FIG. 4 is a cross-sectional view of the electroacoustic conversion device according to Embodiment 1 taken along line I-I shown in FIG. 1.

FIG. 1 is a perspective view illustrating an appearance of electroacoustic conversion device 100 according to Embodiment 1 when viewed from the side of vibration plate 110. FIG. 2 is a perspective view illustrating electroacoustic conversion device 100 according to Embodiment 1 where vibration plate 110 is omitted. FIG. 3 is a perspective view illustrating an appearance of electroacoustic conversion device 100 according to Embodiment 1 when viewed from the side opposite to vibration plate 110. FIG. 4 is a cross-sectional view of electroacoustic conversion device 100 according to Embodiment 1 taken along line I-I shown in FIG. 1.

As illustrated in these drawings, electroacoustic conversion device 100 includes vibration plate 110, inner voice coil 121, outer voice coil 122, magnet 130, yoke 140, and frame 150.

Vibration plate 110 is a member to which inner voice coil 121 and outer voice coil 122 are connected, and performs conversion between acoustic signals generated in inner voice coil 121 and outer voice coil 122 and air vibrations caused by vibration plate 110 which displaces back and forth with respect to its neutral position (Z-axial direction in the diagrams). Vibration plate 110 can be in any shape without limitation. In Embodiment 1, vibration plate 110 is circular in shape when viewed as a whole. Vibration plate 110 includes annular inner connection 111 to which inner voice coil 121 is connected, annular outer connection 112 to which outer voice coil 122 is connected, and annular periphery 113 attached to the frame.

Inner connection 111 and outer connection 112 have trapezoidal cross-sections, and are projected outwardly (Z+ side in the drawing). Inner voice coil 121 and outer voice coil 122 are attached to the flat top surfaces corresponding to the short bases of the respective trapezoidal cross-sections. The inner side of inner connection 111 is sealed by domed inner membrane 114 expanding outwardly. Inner connection 111 and outer connection 112 are connected with ring membrane 115 which has a cross-section of an arc shape and expands outwardly. Outer connection 112 and periphery 113 are connected with edge 116 which has a cross-section of an arc shape and expands outwardly.

Vibration plate 110 can be in any shape such as a conical shape, an elliptical conical shape, a pyramidal shape, an elliptical disc, or a quadrilateral flat plate. Examples of a material forming vibration plate 110 include, but should not be limited to, paper and resin.

Inner voice coil 121 is a part having one end disposed inside inner magnetic gap 141 (see FIGS. 2 and 4) and the other end attached to inner connection 111 of vibration plate 110. Inner voice coil 121 together with vibration plate 110 vibrates to interact magnetic flux constantly present inside inner magnetic gap 141, and performs conversion between air vibrations and acoustic signals.

The winding axis (central axis) of inner voice coil 121 is disposed in the direction of vibration (amplitude) of vibration plate 110 (Z-axial direction in the diagrams), and intersects orthogonal to the direction of the magnetic flux inside inner magnetic gap 141.

In Embodiment 1, inner voice coil 121 is a coil which is in a cylindrical shape when viewed as a whole, and is configured by winding a single metal wire material in the direction of the winding axis (Z-axial direction in the diagrams) several times. Moreover, in inner voice coil 121, multiple layers (two layers in Embodiment 1) of coil are disposed in the diameter direction to be electrically connected in series, and their beginnings of winding and ends of winding are located on the side of vibration plate 110. First inner signal line 161 and second inner signal line 162 extend from inner voice coil 121, and are connected to the ends of the wire material constituting the coil. Details of signal lines including first inner signal line 161 and second inner signal line 162 will be described later.

Outer voice coil 122 is a part attached to vibration plate 110 outside inner voice coil 121 to surround inner voice coil 121. Similarly to inner voice coil 121, outer voice coil 122 interacts with magnetic flux constantly present inside outer magnetic gap 142, thereby performing conversion between vibrations in the direction of the winding axis (Z-axial direction in the diagrams) and acoustic signals.

In Embodiment 1, the winding axis (central axis) of outer voice coil 122 is disposed coaxial with the winding axis of inner voice coil 121. Similarly to inner voice coil 121, outer voice coil 122 is a coil which is in a cylindrical shape when viewed as a whole, and is configured by winding a single metal wire material in the direction of the winding axis (Z-axial direction in the diagrams) several times. Moreover, outer voice coil 122 includes multiple layers (two layers in Embodiment 1) of coil disposed in the diameter direction to be electrically connected in series, and their beginnings of winding and ends of winding are located on the side of vibration plate 110. First outer signal line 163 and second outer signal line 164 extend from outer voice coil 122, and are connected to the ends of the wire material constituting the coil.

The voice coils including inner voice coil 121 and outer voice coil 122 may include a bobbin. The bobbin is a cylindrical member serving as a base around which the wire material is wound, and is made of a material such as aluminum or a resin. Inner voice coil 121 and outer voice coil 122 may have the same winding direction of the wire material, or may have different winding directions thereof. The winding direction is determined depending on the phase of the acoustic signal generated in each coil.

Magnet 130 is a permanent magnet which generates steady magnetic fluxes in inner magnetic gap 141 and outer magnetic gap 142, the steady magnetic fluxes acting on the magnetic fluxes which change based on the acoustic signals input to inner voice coil 121 and outer voice coil 122. Magnet 130 includes wiring portion 133 which is in the form of a through hole or a notch in which first inner signal line 161 and second inner signal line 162 which are paired are provided, first inner signal line 161 and second inner signal line 162 being signal lines for inner voice coil 121.

In Embodiment 1, magnet 130 is in an annular shape with a quadrilateral cross-section, in which the central hole extending through in the thickness direction (Z-axial direction in the diagrams) defines wiring portion 133. Inner cylindrical portion 143, which is in a tubular shape and is part of yoke 140, is inserted and disposed in wiring portion 133 to define annular inner magnetic gap 141 with magnet 130. Tubular insulating member 153 is inserted and disposed in the inner side of wiring portion 133 and in the inner side of inner cylindrical portion 143. First inner signal line 161 and second inner signal line 162 as the inner signal lines are provided in the state where these signal lines inwardly extend from inner voice coil 121 to the inner side of insulating member 153, and penetrate through the inner side of insulating member 153. Such a configuration prevents short circuit between the inner signal lines and yoke 140. Insulating member 153 is integrally formed with frame 150.

Preferably, a neodymium magnet having high magnetic energy is used as magnet 130, for example. This can reduce the thickness of magnet 130, and thus can reduce the total thickness of electroacoustic conversion device 100. Furthermore, the weight thereof can also be reduced.

Yoke 140 is a member which guides the magnetic flux, which generates in a side of magnet 130 opposite to vibration plate 110, to vibration plate 110 in the direction of the winding axis of inner voice coil 121, and generates the steady magnetic flux in inner magnetic gap 141 and outer magnetic gap 142 disposed between magnet 130 and yoke 140. Yoke 140 is made of a magnetic material.

Yoke 140 according to Embodiment 1 includes annular base portion 145 with a quadrilateral cross-section, annular magnet 130 being attached to base portion 145. Inner cylindrical portion 143 projecting from the inner periphery of base portion 145 toward the side of vibration plate 110 is disposed, and outer cylindrical portion 144 projecting from the outer periphery of base portion 145 toward the side of vibration plate 110 is disposed.

Yoke 140 may include an annular top plate on a side opposite to base portion 145 with respect to magnet 130. While in Embodiment 1, magnet 130 and base portion 145 of yoke 140 are fixed with an adhesive, magnet 130 and yoke 140 may be fixed using a fastening member such as a screw or a rivet.

Magnet 130 and yoke 140 form a magnetic circuit. The magnetic circuit is attached to frame 150 to be located behind vibration plate 110, and includes annular inner magnetic gap 141 and outer magnetic gap 142 which face vibration plate 110. Inner magnetic gap 141 is a gap in which the steady magnetic flux is generated in a direction crossing the magnetic flux generated in inner voice coil 121, and outer magnetic gap 142 is a gap in which the steady magnetic flux is generated in a direction crossing the magnetic flux generated in outer voice coil 122.

Frame 150 is a member which holds vibration plate 110 and yoke 140. In Embodiment 1, frame 150 includes first frame 151 which is in a cylindrical shape and is attached to outer cylindrical portion 144 of yoke 140, and second frame 152 which is in an annular shape and covers the surface of base portion 145 of yoke 140 opposite to vibration plate 110. Cylindrical insulating member 153 projects from the inner periphery of second frame 152 toward the side of vibration plate 110, and is integrally formed with second frame 152.

Frame 150 is a member which accommodates the magnetic circuit, inner voice coil 121, and outer voice coil 122. The outer peripheral portion of vibration plate 110 is attached to an open end of first frame 151 with an adhesive or the like. Although frame 150 can be made of any material without limitation, frame 150 is a resin molded article having insulation properties in Embodiment 1.

The signal line is an electric wire referred to as tinsel wire, which inputs an acoustic signal to a voice coil or outputs the acoustic signal from the voice coil. In Embodiment 1, first inner signal line 161 and second inner signal line 162, which are inner signal lines connected to inner voice coil 121, are provided within a plane including the winding axis of inner voice coil 121 inside frame 150. First outer signal line 163 and second outer signal line 164, which are outer signal lines connected to outer voice coil 122, are provided within a plane vertical to the winding axis of inner voice coil 121 inside frame 150.

First inner signal line 161 and second inner signal line 162 penetrate through the inner side of cylindrical insulating member 153, and are provided to the outside of second frame 152. First outer signal line 163 and second outer signal line 164 pass through a gap between outer cylindrical portion 144 of yoke 140 and vibration plate 110, extend through the insides of a pair of grooves 154 disposed in first frame 151, and are provided to the outside of first frame 151.

Inner voice coil 121 includes two layers of outer and inner coils in the diameter direction. First inner signal line 161 connected to an end of the outer coil is provided to extend from the outer side of inner voice coil 121 over the edge portion of inner voice coil 121 in abutment with vibration plate 110 and project to the inner side of inner voice coil 121. Inner connection 111 of vibration plate 110 includes annular inner protrusion 117 and outer protrusion 118 on the inner and outer sides of inner voice coil 121 to be attached, inner protrusion 117 and outer protrusion 118 protruding toward magnet 130. First inner signal line 161 is bent or curved to avoid inner protrusion 117.

Electroacoustic conversion device 100 according to Embodiment 1 has a small area of inner membrane 114 corresponding to inner voice coil 121 and has a light weight, which are advantageous to vibration at high frequencies. Thus, electroacoustic conversion device 100 can have a frequency bandwidth extending to a high-frequency range. Moreover, ring membrane 115 corresponding to outer voice coil 122 has a large area, which is advantageous to an improvement in sound pressure level. Accordingly, even when the diameter of entire vibration plate 110 is reduced, the ability to convert acoustic signals and air vibrations can be enhanced by inner voice coil 121 and outer voice coil 122.

Moreover, first inner signal line 161 and second inner signal line 162 connected to inner voice coil 121 pass through wiring portion 133, which penetrates through the center of magnet 130 in the thickness direction, and are provided outside frame 150. For this reason, first inner signal line 161 and second inner signal line 162 do not interfere with outer voice coil 122 and the outer signal lines.

Embodiment 2

Electroacoustic conversion device 100 according to Embodiment 2 will be described. Identical referential numerals will be given to components (parts) having actions, functions, shapes, mechanisms, or structures similar to those in Embodiment 1, and their descriptions will be omitted in some cases. Hereinafter, differences from Embodiment 1 will be mainly described, and description of the same contents will be omitted in some cases.

Figure 5:
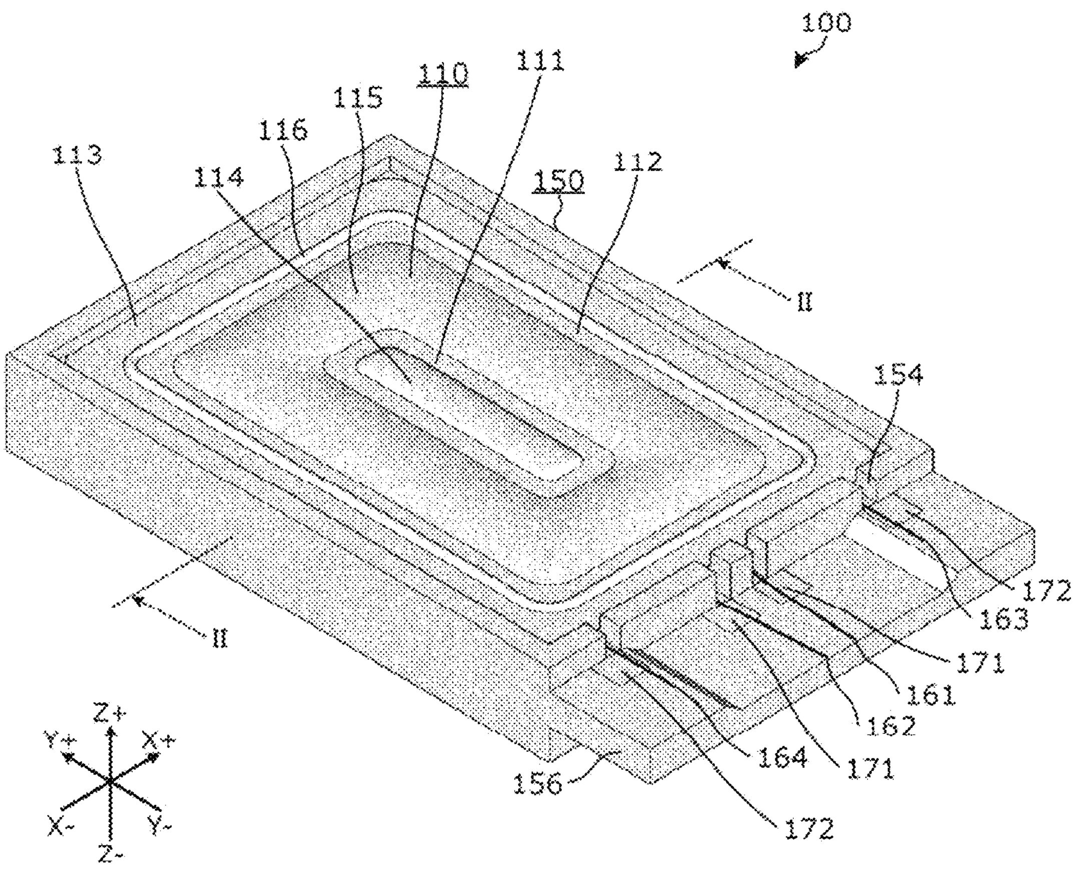
FIG. 5 is a perspective view illustrating an appearance of the electroacoustic conversion device according to Embodiment 2 when viewed from a side of a vibration plate.
Figure 6:
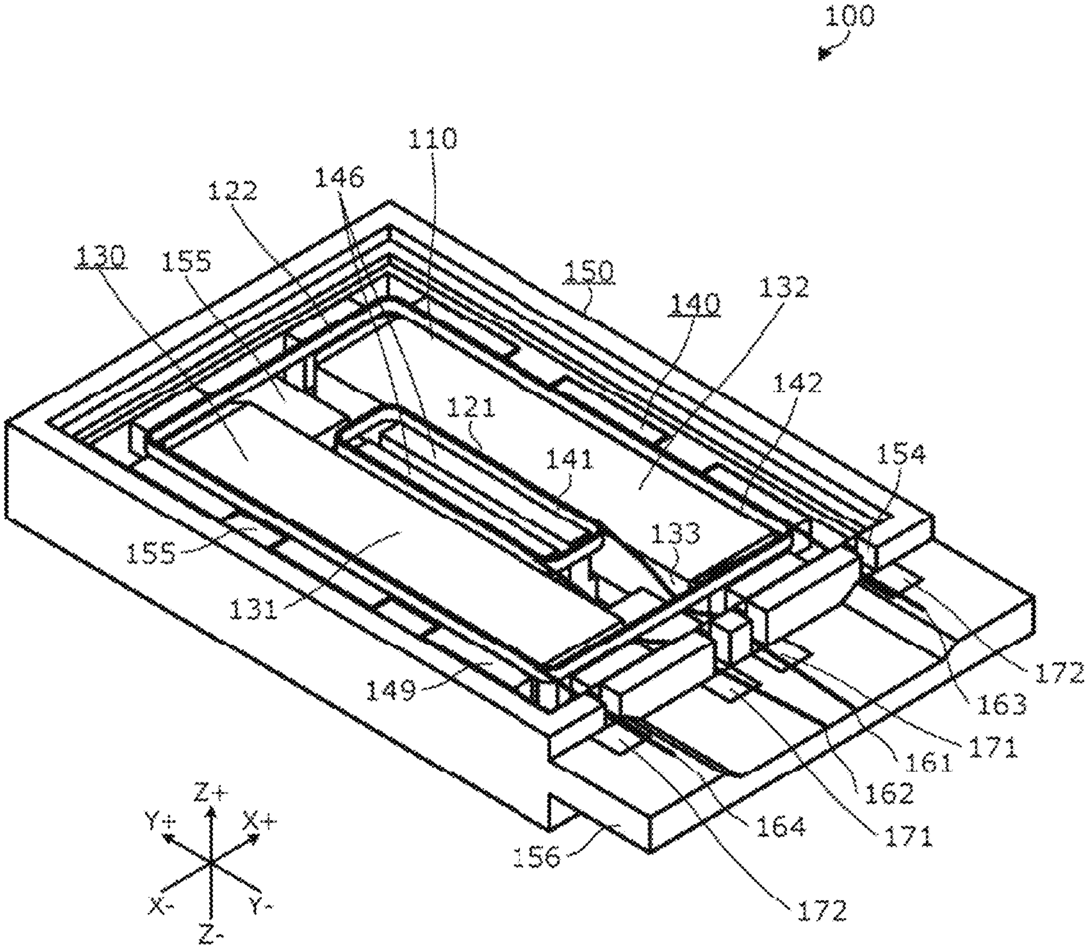
FIG. 6 is a perspective view illustrating the electroacoustic conversion device according to Embodiment 2 where the vibration plate is omitted.
Figure 7:
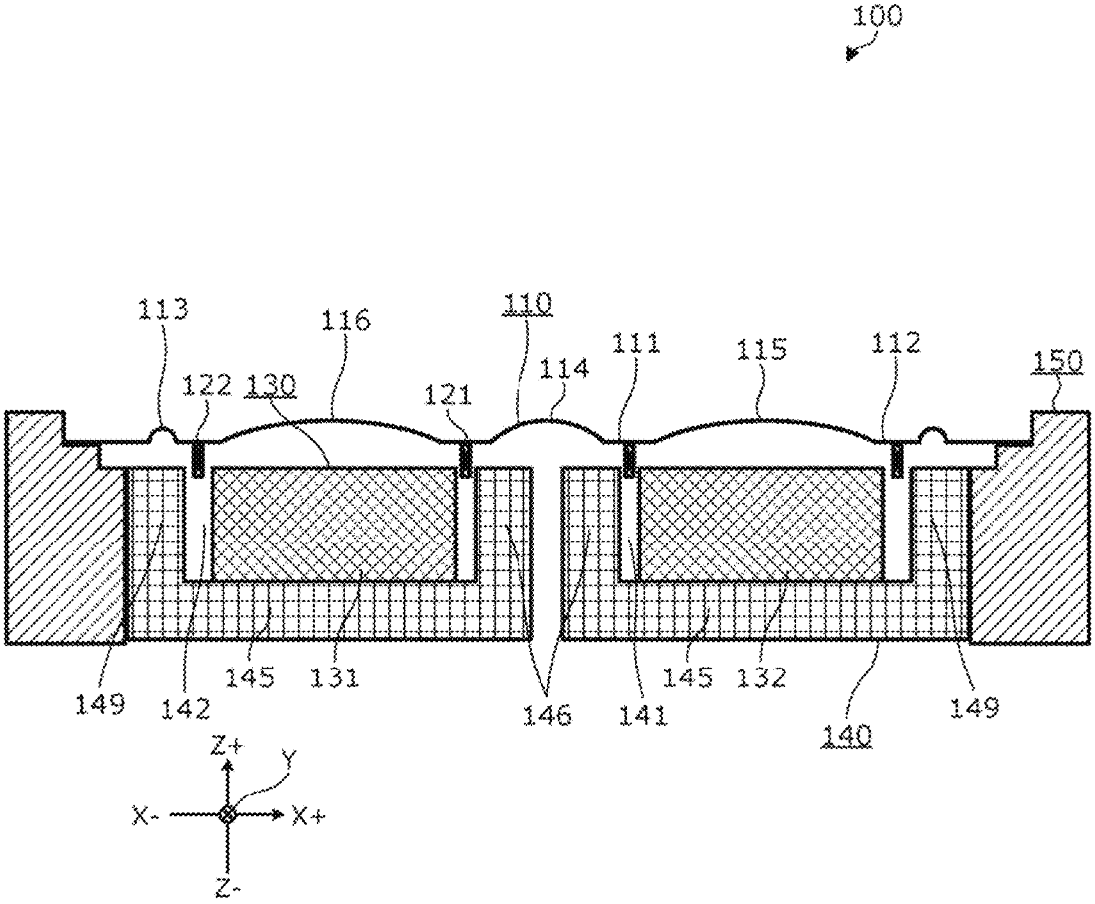
FIG. 7 is a cross-sectional view illustrating the electroacoustic conversion device according to Embodiment 2 taken along line II-II shown in FIG. 5.
Figure 8:
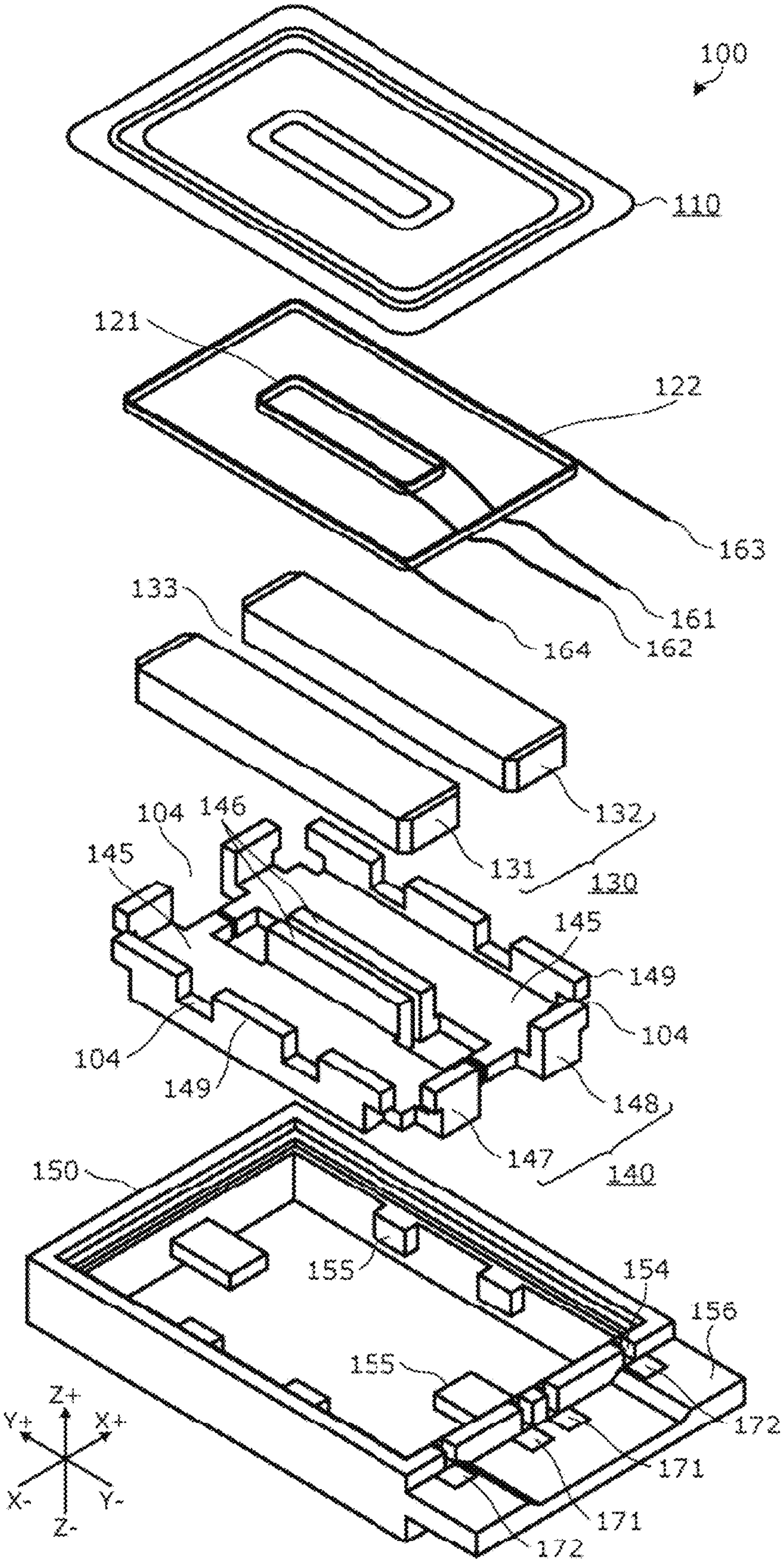
FIG. 8 is an exploded perspective view illustrating the electroacoustic conversion device according to Embodiment 2.

FIG. 5 is a perspective view illustrating an appearance of electroacoustic conversion device 100 according to Embodiment 2 when viewed from a side of vibration plate 110. FIG. 6 is a perspective view illustrating electroacoustic conversion device 100 according to Embodiment 2 where vibration plate 110 is omitted. FIG. 7 is a cross-sectional view illustrating electroacoustic conversion device 100 according to Embodiment 2 taken along line II-II shown in FIG. 5. FIG. 8 is an exploded perspective view illustrating electroacoustic conversion device 100 according to Embodiment 2.

As illustrated in these diagrams, electroacoustic conversion device 100 according to Embodiment 2 includes vibration plate 110, inner voice coil 121, outer voice coil 122, magnet 130, yoke 140, and frame 150.

In Embodiment 2, vibration plate 110 is in a quadrilateral (rectangular or square) shape when viewed as a whole. Vibration plate 110 includes inner connection 111 which is in a quadrilateral ring shape and to which inner voice coil 121 is connected, outer connection 112 which is in a quadrilateral ring shape and to which outer voice coil 122 is connected, and periphery 113 which is in a quadrilateral ring shape and is attached to the frame.

Inner connection 111 and outer connection 112 have cross-sections in the form of a flat plate. The inner side of inner connection 111 is sealed with inner membrane 114 expanding outwardly. Inner connection 111 and outer connection 112 are connected with ring membrane 115 which has a cross-section of an arc shape and expands outwardly. Outer connection 112 and periphery 113 are connected with edge 116 which has a cross-section of an arc shape and expands outwardly.

Inner voice coil 121 is a part having one end disposed inside inner magnetic gap 141 (see FIGS. 6 and 7) and the other end attached to inner connection 111 of vibration plate 110. Inner voice coil 121 generates magnetic flux based on the acoustic signal input, and vibrates in the direction of the winding axis (Z-axial direction in the diagrams) by interaction with the magnetic flux constantly present inside inner magnetic gap 141.

The winding axis (axis passing through the center of the vibration plate and virtually extending in the vibration direction of the vibration plate) of inner voice coil 121 intersects orthogonal to the direction of the magnetic flux inside inner magnetic gap 141.

In Embodiment 2, outer voice coil 122 is attached to vibration plate 110 outside inner voice coil 121 to surround inner voice coil 121, and the winding axis (central axis) of outer voice coil 122 is disposed coaxially with the winding axis of inner voice coil 121. Similarly to inner voice coil 121, outer voice coil 122 is a coil configured by winding a single metal wire material in the direction of the winding axis (Z-axial direction in the diagrams) several times. Moreover, outer voice coil 122 includes multiple layers (two layers in Embodiment 2) of coil disposed in the diameter direction to be electrically connected in series, and their beginnings of winding and ends of winding are located on the side of vibration plate 110. First outer signal line 163 and second outer signal line 164 extend from outer voice coil 122, and are connected to the ends of the wire material constituting the coil.

In Embodiment 2, magnet 130 includes first magnet 131 of a cuboid and second magnet 132 which are the same in shape and size as those of first magnet 131. The edge portions at both ends of first magnet 131 and second magnet 132 in the transverse direction (Y-axial direction in the diagrams) are chamfered. Such a configuration can avoid interference of the curved four corners of outer voice coil 122 with magnet 130. This can also suppress deficits of magnet 130 made of a fragile material. Although the magnets are chamfered in Embodiment 2, the magnets may be rounded.

First magnet 131 and second magnet 132 are aligned with a predetermined gap in the transverse direction (X-axial direction in the diagrams) such that their facing surfaces are parallel to each other. The gap between first magnet 131 and second magnet 132 defines wiring portion 133 penetrating in the thickness direction (Z-axial direction in the diagrams) and in the transverse direction (Y-axial direction in the diagrams). To be noted, it is assumed that the magnet included in a conventional electroacoustic conversion device is a magnet which is in a quadrilateral ring shape and is provided with a quadrilateral through hole in the center thereof when viewed in plane view. In the case of the present embodiment, wiring portion 133 can also be considered as a partially notched portion of the conventional magnet which is in a quadrilateral ring shape.

Inner walls 146 in the form of a wall which is part of yoke 140 are inserted and disposed in the intermediate portion of wiring portion 133 in the transverse direction to form linear inner magnetic gaps 141 with first magnet 131 and second magnet 132, respectively. First inner signal line 161 and second inner signal line 162, which are inner signal lines, are provided inside wiring portion 133 to be gradually remote from vibration plate 110 as these signal lines extend from inner voice coil 121 toward the outside in the transverse direction. These wirings extend under outer voice coil 122 to the outside of frame 150. The inner signal lines are provided to be gradually close to vibration plate 110 as these signal lines extend from outer voice coil 122 to the outside in the transverse direction.

Yoke 140 according to Embodiment 2 includes first yoke 147 and second yoke 148 which correspond to first magnet 131 and second magnet 132, and are different portions. First yoke 147 and second yoke 148 are aligned with a predetermined gap in the transverse direction (X-axial direction in the diagrams). First yoke 147 and second yoke 148 include base portions 145 in the form of a quadrilateral plate to which first magnet 131 and second magnet 132 that are cuboids are attached. Walls 146 in the form of a plate which project toward the side of vibration plate 110 are arranged in the inner sides of base portions 145, and outer peripheral walls 149 in the form of a plate which project toward the side of vibration plate 110 are arranged across from the outer peripheral portions of base portions 145 aligned. Each outer peripheral wall 149 includes a plurality of penetrating notches 104 to which protrusions 155 provided in frame 150 are inserted.

In Embodiment 2, frame 150 holds first yoke 147 and second yoke 148 in the state where frame 150 surrounds outer peripheral walls 149 of yoke 140. Frame 150 is in a quadrilateral tubular shape, and includes protrusions 155 protruding inwardly from the inner circumferential surfaces. First yoke 147 and second yoke 148 are inserted into frame 150 from the side opposite to a portion where vibration plate 110 is attached, and protrusions 155 are engaged with notches 104. Thereby, frame 150 is aligned with first yoke 147 and second yoke 148. Thereby, the predetermined gap between first yoke 147 and second yoke 148 is determined.

In Embodiment 2, first inner signal line 161 and second inner signal line 162, which are inner signal lines connected to inner voice coil 121, and first outer signal line 163 and second outer signal line 164, which are outer signal lines connected to outer voice coil 122, are provided to be directed in the same direction in the transverse direction.

First inner signal line 161, second inner signal line 162, first outer signal line 163, and second outer signal line 164 pass through notches 104 disposed in surfaces of outer peripheral walls 149 of yoke 140 and through four grooves 154 disposed in surfaces of frame 150, and are provided to the outside of frame 150.

In Embodiment 2, electroacoustic conversion device 100 includes inner input terminals 171 which are paired and electrically connected to first inner signal line 161 and second inner signal line 162, and outer input terminals 172 which are paired and electrically connected to first outer signal line 163 and second outer signal line 164. Inner input terminals 171 and outer input terminals 172 are attached to terminal base 156 in the form of a quadrilateral plate which outwardly projects from the surface of frame 150 including grooves 154.

The frequency range of the acoustic signal input from an amplifier to inner input terminal 171 may be higher than that of the acoustic signal input from the amplifier to outer input terminal 172. Depending on the winding direction of the wire material of inner voice coil 121 and outer voice coil 122, acoustic signals having opposite phases may be input to inner input terminal 171 and outer input terminal 172 from the amplifier.

Electroacoustic conversion device 100 according to Embodiment 2 has a small area of inner membrane 114 corresponding to inner voice coil 121 and has a light weight, which are advantages to vibration at high frequencies. Thus, electroacoustic conversion device 100 can have a frequency bandwidth extending to a high-frequency range. Moreover, ring membrane 115 corresponding to outer voice coil 122 has a large area, which is advantageous to an improvement in sound pressure level. Accordingly, even when the diameter of entire vibration plate 110 is reduced, the ability to convert acoustic signals and air vibrations can be enhanced by inner voice coil 121 and outer voice coil 122.

Moreover, first inner signal line 161 and second inner signal line 162 connected to inner voice coil 121 pass through wiring portion 133 as the gap between first magnet 131 and second magnet 132, and are provided outside frame 150. For this reason, first inner signal line 161 and second inner signal line 162 do not interfere with outer voice coil 122 and the outer signal lines.

Moreover, first inner signal line 161, second inner signal line 162, first outer signal line 163, and second outer signal line 164 are provided to be directed in the same direction. This configuration can facilitate handling of the wiring to the amplifier.

The present disclosure is not limited to the embodiments above. For example, other embodiments implemented by any combination of the components described in this specification by excluding some of the components may be included in embodiments according to the present disclosure. Moreover, the present disclosure also covers modifications of the embodiments above obtained by modifying the embodiments above in various ways conceived by persons skilled in the art without departing from the gist of the present disclosure, namely, the meanings expressed by the language used in CLAIMS.

For example, annular magnet 130 has been exemplified in Embodiment 1 while the magnet may be in a quadrilateral ring shape.

Moreover, magnet 130 divided into two and yoke 140 divided into two have been exemplified in Embodiment 2 while at least one of these components may be integrally formed.

Figure 9:
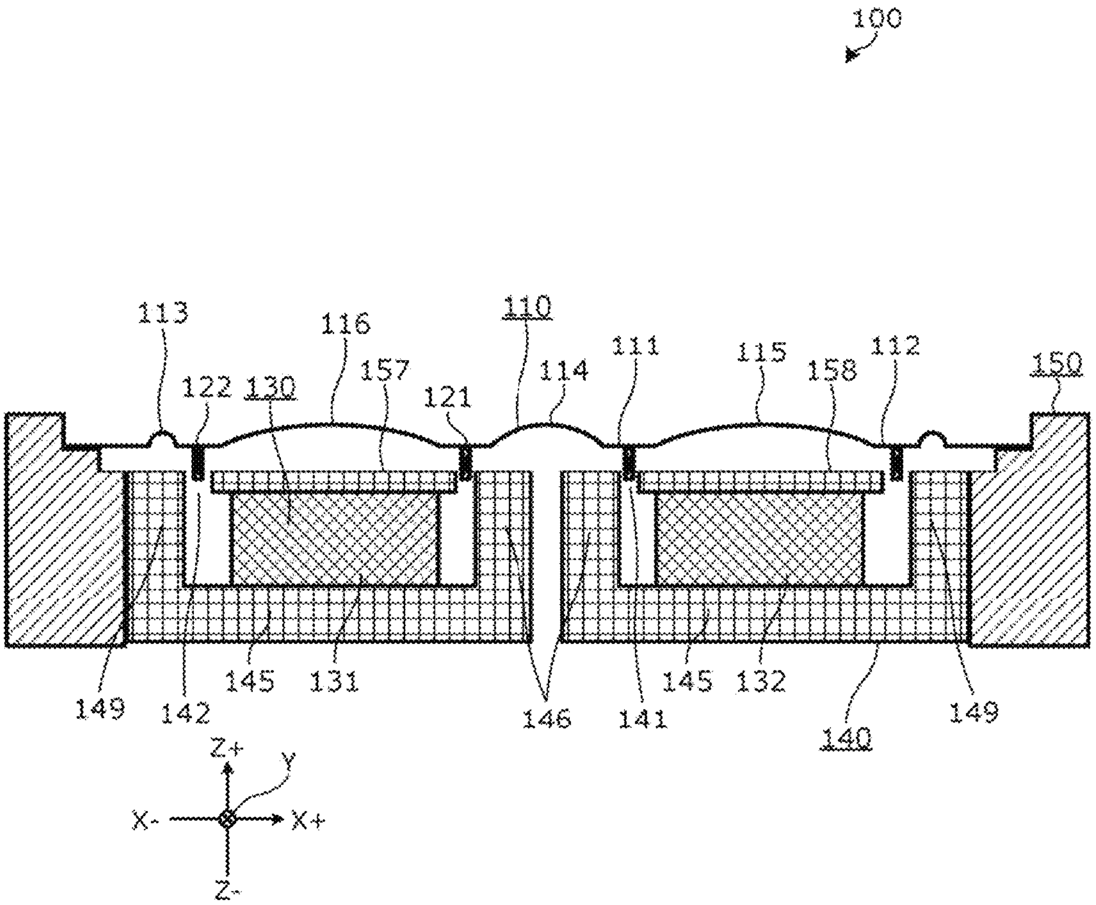
FIG. 9 is a cross-sectional view illustrating another example of the electroacoustic conversion device.
Figure 10:
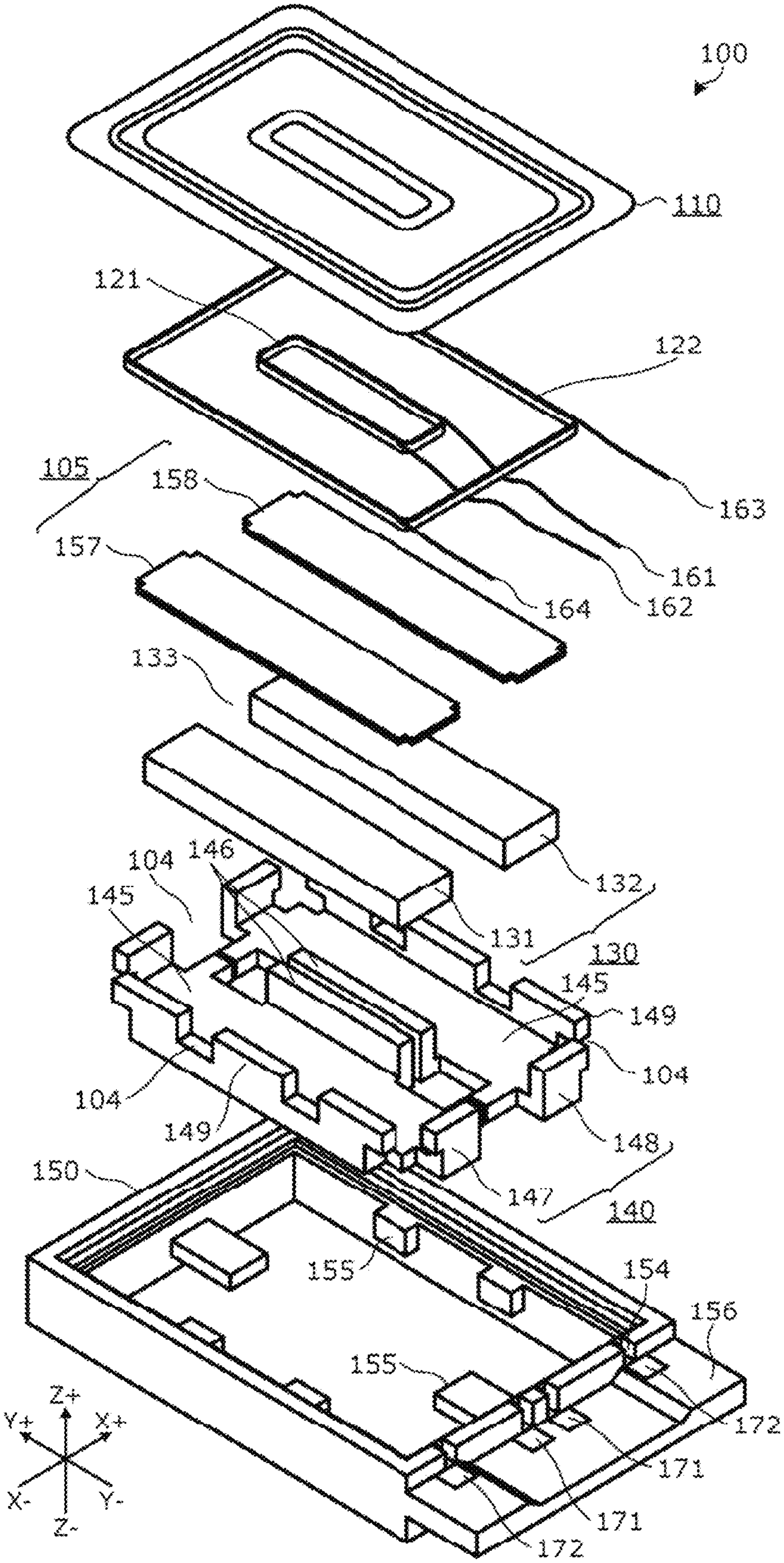
FIG. 10 is an exploded perspective view of the another example of the electroacoustic conversion device.

As illustrated in FIGS. 9 and 10, electroacoustic conversion device 100 may include first top plate 157 and second top plate 158 corresponding to first magnet 131 and second magnet 132 (hereinafter, collectively referred to as "top plate 105" in some cases). Top plate 105 is a member disposed in contact with magnet 130 on the side of magnet 130 opposite to yoke 140. Top plate 105 is a member which is made of a magnetic material and forms inner magnetic gap 141 and outer magnetic gap 142 with yoke 140. Top plate 105 concentrates the steady magnetic flux generated by magnet 130 on inner magnetic gap 141 and outer magnetic gap 142. Such a configuration can improve the electroacoustic conversion efficiency in inner voice coil 121 and outer voice coil 122.

As illustrated in FIG. 10, a quadrilateral notch may be disposed in the four corners of top plate 105. The corners may be chamfered or rounded. Such a configuration can avoid interference of the corners of top plate 105 with outer voice coil 122.

When electroacoustic conversion device 100 includes top plate 105, magnet 130 has a dimension such that magnet 130 is hidden by top plate 105 in top surface view, and the four corners of magnet 130 may not be subjected to chamfering with intension.

Wiring portion 133 may be formed by cutting out part of magnet 130.

Moreover, electroacoustic conversion device 100 may be used in an acoustic system including an amplifier to which an acoustic signal containing components having higher intensities in the higher-frequency range compared to the range of outer voice coil 122 can be input.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2021-173836 filed on Oct. 25, 2021.

INDUSTRIAL APPLICABILITY

The present disclosure can be used in electroacoustic conversion devices such as microphones and loudspeakers, and can be used in electroacoustic conversion devices which perform conversion between acoustic sounds in a high-frequency range and acoustic signals, in particular.

The invention claimed is:

1. An electroacoustic conversion device comprising:
- a vibration plate;
- an inner voice coil attached to the vibration plate;
- an outer voice coil attached to the vibration plate outside the inner voice coil to surround the inner voice coil;
- a magnet;
- a yoke; and
- a frame which holds the vibration plate and the yoke,
- wherein the magnet includes a wiring portion which is in a form of a through hole or a notch in which inner signal lines which are paired are provided, the inner signal lines being signal lines for inputting an acoustic signal to the inner voice coil or outputting the acoustic signal from the inner voice coil.

2. The electroacoustic conversion device according to claim 1,
- wherein the magnet includes the wiring portion in a central portion of the magnet,
- the electroacoustic conversion device comprises an insulating member inserted and disposed in the wiring portion, and
- the inner signal lines project toward an inner side of the inner voice coil, and are provided on an inner side of the insulating member.

3. The electroacoustic conversion device according to claim 2,
- wherein the inner signal lines are provided within a plane including a winding axis of the inner voice coil inside the frame.

4. The electroacoustic conversion device according to claim 2,
- wherein one of the inner signal lines extends from an outer side of the inner voice coil over an edge portion of the inner voice coil in abutment with the vibration plate, and projects to the inner side of the inner voice coil.

5. The electroacoustic conversion device according to claim 4,
- wherein the vibration plate includes an inner protrusion and an outer protrusion on the inner and outer sides of the inner voice coil to be attached, respectively, the inner protrusion and the outer protrusion each being annular in shape and protruding toward the magnet, and
- the inner signal lines are bent or curved to avoid the inner protrusion.

6. The electroacoustic conversion device according to claim 1, wherein the magnet includes a first magnet and a second magnet, the wiring portion is formed between the first magnet and the second magnet, and the inner signal lines extend toward the outer side of the inner voice coil and project over the outer voice coil.

7. The electroacoustic conversion device according to claim 6, further comprising:

a first top plate and a second top plate which are quadrilateral plate shaped and correspond to the first magnet and the second magnet, wherein the first top plate and the second top plate each include quadrilateral notches in four corners.

8. The electroacoustic conversion device according to claim 1, wherein the inner signal lines which are paired and outer signal lines which are paired as signal lines for the outer voice coil are connected to an amplifier to cause acoustic signals of opposite phases to flow in the inner voice coil and the outer voice coil.

9. The electroacoustic conversion device according to claim 1, further comprising:

inner input terminals which are paired and electrically connected to the inner signal lines which are paired; and outer input terminals which are paired and electrically connected to outer signal lines which are paired as signal lines for the outer voice coil, wherein a frequency range of an acoustic signal input to the inner input terminals by an amplifier is higher than a frequency range of an acoustic signal input to the outer input terminals by the amplifier.

10. The electroacoustic conversion device according to claim 1, wherein an inner portion of the magnet includes the wiring portion.

11. The electroacoustic conversion device according to claim 1, wherein:

the inner voice coil is disposed closer to a center of the vibration plate than the magnet, the outer voice coil is disposed farther from the center of the vibration plate than the magnet, and the outer voice coil is disposed farther from the center of the vibration plate than the inner voice coil.

* * * * *